Patented Sept. 12, 1933

1,926,148

UNITED STATES PATENT OFFICE 1,926,148

MEHOD OF ACTIVATING CLAY

Frederick W. Huber, Riverside, Calif.

No Drawing. Application August 27, 1932
Serial No. 630,701

9 Claims. (Cl. 252—2)

This invention relates to the activation of clays by acid treatment, and particularly to activation of clays of the bentonite or montmorillonite type. These clays, in general, are hydrous aluminum silicates resulting from alteration or decomposition of volcanic clays or feldspar, and in their natural state ordinarily possess little or no adsorbent or decolorizing properties for mineral oils. The term "activation" is used herein to denote the treatment of such materials by a process involving "cooking" or digesting of the clay with acid, in such manner as to impart decolorizing or adsorbent properties thereto and render the same suitable for use as decolorizing or bleaching agents for oils.

The so-called "activation" of bleaching or decolorizing earths by treatment with acid apparently depends upon the decomposition of a portion of the silicates present therein, resulting in the conversion of oxides of alkali and alkaline earth metals, and of some of the ferric oxide and alumina, present therein, to the form of water soluble salts of the acid used, and the removal of such salts from the remaining portion, including insoluble products formed by the acid treatment. The amount of material to be extracted varies with different earths and with the amount of activation desired. This treatment appears to alter the physical structure of the material as well as the chemical composition thereof, or to modify the surface characteristics thereof in some way, so as to give it the desired adsorptive properties.

The principal object of the present invention is to provide a more rapid and economical method of converting such clays into decolorizing agents of high efficiency by acid treatment thereof, than the methods heretofore used for that purpose. More specifically, it is an object of the invention to carry out the acid treatment and the subsequent washing and separation of the acid treated clay in such manner that the entire operation may be conducted more quickly and economically than has heretofore been done.

A particular object of the invention is to provide a method of activation, in which the acid treated clay may be quickly and effectively washed, and separated by sedimentation from the washing liquid, thus greatly decreasing the total time required for production of the finished decolorizing agent.

A further object of the invention is to provide a novel and advantageous method for washing activated slay obtained by acid treatment of a raw clay.

According to the method now commonly used for acid treatment of clays of the type above described, the raw clay is placed in a receptacle, and is mixed with water and with about 7% to 35% of its weight of concentrated sulphuric acid, the amount of water used being sufficient to produce a more or less fluid pulp. The mixing of the clay, acid and water is effected either by adding sufficient water to the clay to form a pulp and then adding the acid, or by first preparing a solution of acid in the desired quantity of water and adding this solution to the clay. This pulp is then cooked or digested for from 5 to 8 hours, at or near boiling temperature, after which it is transferred to suitable settling apparatus, such as thickeners, where it is diluted with fresh water and allowed to settle. The settled or thickened pulp is then drawn off into a second settling or thickening apparatus, where an additional quantity of fresh water is added, and the process is repeated until the insoluble solids remaining after acid treatment are washed substantially free of soluble salts and acids. Although this operation appears comparatively simple, it is quite slow and time consuming when applied to the treatment of large quantities of material, for the reason that a period of several hours (ordinarily from about 4 to 12 hours) is required for each settling or thickening operation, and the total time required for the complete process is ordinarily about 50 to 75 hours.

I have found, however, that by controlling the manner in which the acid and water are mixed with the clay, and by properly adjusting the ratio of water to solids after the cooking is completed, and then allowing the mixture to stand, sedimentation of the activated clay particles is caused to occur with relatively great rapidity. If the supernatant liquid is then separated from the settled material, and an additional quantity of fresher water is added and the whole mass agitated for a few minutes, and the ratio of water to solids again adjusted to a certain value, rapid sedimentation may again be obtained, so that the desired number of washing operations, usually about 4 or 5, may be completed within a relatively short period, and the total time of treatment may be reduced to about 5 to 10 hours.

Observations made in the treatment of clays of the above described type with water and acid added thereto in different amounts and according to different procedures, indicate that if the mixing is effected by feeding the water into the dry clay to form a pulp and then adding the acid, or by feeding an aqueous solution of acid into a quantity of dry clay to form a pulp, the pulp thickens and becomes more or less gelatinous. On cooking this mass, the structure is partially broken up into smaller particles but the gelatinous quality thereof persists. These particles settle very slowly, particularly when the usual ratios of water to solids are maintained, due to the tendency of the material to take up or imbibe large quantities of water and swell. Furthermore, a relatively long time of contact is required for completely dissolving or washing the soluble salts and acids from these gelatinous particles.

The procedure of the present invention is such as to prevent or minimize the formation of gels or of gelatinous particles, thus facilitating both the washing or dissolving of the soluble salts and acids from the insoluble solids, and also the sedimentation of the solids from the resulting solution.

The clay, for example a clay of the montmorillonite or bentonite type, is preferably first crushed or ground to suitable fineness, for example about 10 mesh, and is partially dried, for example by air drying, although the exact degree of dryness obtained prior to the acid treatment is not critical.

The clay, in divided condition, may then be thoroughly mixed with from 7 to 35% of its weight of concentrated sulphuric or hydrochloric acid, so as to secure fairly uniform distribution of the acid throughout the clay, and the resulting mixture may then be fed or introduced into sufficient water to make a fluid pulp, for example, a weight of water approximately equal to that of the air dried clay. Or, if desired, the clay may be fed or introduced directly into an aqueous solution containing approximately 7 to 35% of acid by weight of the clay and containing sufficient water to provide a fluid pulp. In this case also, the weight of water may advantageously be approximately equal to the weight of clay.

The pulp containing clay, acid and water, obtained by either of the above methods of procedure, and containing a weight of acid solution preferably somewhat in excess of the weight of clay, is then cooked or digested at a suitable elevated temperature, and is preferably kept in violent agitation during this operation. This cooking operation may advantageously be conducted in a conical tank or vessel into the lower portion of which live steam is introduced, preferably through a pipe extending to near the bottom of the cone. This live steam serves both to heat the mass and also to produce agitation, and the agitation may be further increased by introduction of compressed air either through the same pipe or through a separate pipe. It will be understood, however, that other means may be employed for heating the mass and actively agitating the same. The temperature is preferably maintained at 180° F. or higher (for example, about 190° F.), and this operation is continued for such a period as is found to produce the desired activation and preferably until the reaction of the acid on the clay is substantially completed, resulting in the formation of soluble salts and the production of activated clay particles, as above described. The actual time required for this treatment may vary considerably in different cases, but I have found that in most cases a period of from 1 to 3 hours is sufficient.

The activated clay particles are then separated from the liquid containing in solution soluble salts formed by the acid reaction, and are subjected to a plurality of water washing and settling operations, either in the same vessel in which the cooking operation was conducted, or after being transferred to another vessel or vessels. For this purpose, the water content of the pulp is first adjusted to provide a liquid-solid ratio of at least 2:1, this adjustment being effected by dilution with fresher water in suitable quantity. The mass is then brought to rest and allowed to settle for a suitable period of time, ordinarily from about 20 minutes to one hour, to cause fairly complete sedimentation of the activated clay particles. At the end of this sedimentation period, the supernatant layer of substantially clear solution should ordinarily occupy from one-half to two-thirds of the total depth of the mass, and this supernatant liquid may then be removed in any suitable manner, as for example by decantation or siphoning.

A further quantity of fresher water is then added, in sufficient amount to provide a pulp of suitable fluidity for thorough agitation. For this purpose, the quantity of water added may, for example, be sufficient to provide a ratio of total solution to solids between one and one-half to one and two to one, or somewhat greater. This pulp is then agitated violently, as for example by injection of compressed air, for a sufficient time to cause a further portion of the soluble salts and acid contained in the clay to be dissolved in the water, for example a period of 10 to 30 minutes, and the temperature is preferably maintained at about 100° F. or higher during this period. The water content is again adjusted, by addition of any necessary quantity of fresher water, to provide a liquid-solid ratio of at least 2:1, and is then again allowed to settle to cause sedimentation of the clay particles, after which the supernatant solution is removed.

It will be understood that if the quantity of water added before agitation was sufficient to provide a liquid-solid ratio of 2 to 1 or greater, it may be unnecessary to add any additional water before settling, except such as may be required to compensate for evaporation during agitation. The relative amounts of water added before and after agitation, in this and succeeding washing operations, may be varied somewhat, the essential requirements being that the water added to the thickened pulp, before agitation, shall be sufficient to provide proper fluidity for effective agitation, and that the pulp shall be caused to have a liquid-solid ratio of at least 2 to 1 at the start of the settling operation.

These operations of diluting with water, agitating, adjusting the liquid-solid ratio to at least 2:1, settling and removal of the supernatant liquid layer are repeated until the pulp is substantially free from soluble salts and acids. Ordinarily, four or five repetitions of these operations are sufficient for this purpose. In each of these operations, the liquid-solid ratio is adjusted to the value above mentioned, and it has been found that if the process is carried out as above described, substantially complete sedimentation of the clay particles from a supernatant layer of substantially clear solution may be obtained, in each case, in a relatively short period, for example, about 20 minutes to one hour.

After removal of the supernatant solution obtained in the last washing and settling operation, the pulp is de-watered, preferably by filtration, and is then dried by heating to a suitable temperature, preferably not exceeding 150° C., and finally ground to the desired fineness, for example to a fineness of from 75% to 100% minus 200 mesh. The clay is then ready to be used, stored or packed for shipment.

As a specific example of the method of this invention, I will now describe the treatment of a clay known as a montmorillonite clay, having approximately the following analysis:

| | Percent |
|---|---|
| $SiO_2$ | 62.00 |
| $Al_2O_3$ | 21.00 |
| $Fe_2O_3$ | 3.00 |
| $CaO$ | 2.50 |
| $MgO$ | 1.50 |
| $K_2O + Na_2O$ | 2.00 |
| Water (after drying at 100° C.) | 8.00 |

With a clay of this composition, I have found that excellent results are obtained by treatment with about 30% of its weight of concentrated sulphuric acid. Ten tons of the dry clay are first mixed with three tons of 66° B. sulphuric acid, and this mixture is then fed or introduced into ten tons of water in a conical bottom tank. If desired, this procedure may be varied by feeding the ten tons of dry clay into a solution containing ten tons of water and three tons of 66° B. sulphuric acid.

The pulp is then cooked by injection of live steam, and kept in violent agitation by introduction of compressed air, for a period of three hours, the temperature being maintained at about 190° F.

Fresh water is then added until the total weight of liquid present is at least about 20 tons, thus providing a liquid-solid ratio of at least 2:1. The clay is then allowed to settle for about 20 minutes, and the clear supernatant liquid is removed by decantation or siphoning.

The clay is then subjected to further washing operations, in which fresh water is added in sufficient amount to bring the total weight of the solution up to about 15 tons or somewhat greater, the exact amount of water to be added depending upon the amount of supernatant liquid previously removed, and the pulp is then violently agitated for about 15 minutes at a temperature of at least 100° F. Additional water is then added in sufficient amount to bring the weight of solution up to at least about 20 tons, thus again providing a liquid-solid ratio of at least 2 to 1. The mass is then allowed to settle for about 20 minutes, and the supernatant liquid is removed by decantation or siphoning. This washing operation is repeated four or five times, until the total acidity of the pulp is reduced to about 0.3%, after which the pulp is de-watered, dried and ground as above described, and then packed for shipment.

The present invention relates not only to the complete method of acid activation of clays as above described, including the acid treatment and the washing operation, but also to the specific method of washing above described, as applied to activated clay obtained by any process of acid treatment.

I claim:

1. The method of activating clay which comprises mixing clay with from 7% to 35% of its weight of concentrated acid and with sufficient water to form a fluid pulp, heating and violently agitating said pulp for a sufficient length of time to cause reaction of said acid on constituents of the clay to form soluble salts, adjusting the water content of said pulp to provide a liquid-solid ratio of at least 2 to 1, then allowing the pulp to settle to cause sedimentation of the activated clay particles, and separating the supernatant liquid containing in solution soluble salts formed by said acid reaction.

2. The method of activating clay which comprises mixing clay with from 7% to 35% of its weight of concentrated acid and with a quantity of water approximately equal to the weight of the clay and sufficient to form a fluid pulp, heating and violently agitating said pulp for a sufficient length of time to cause reaction of the acid on constituents of the clay to form soluble salts, adding water to said pulp to bring the liquid-solid ratio thereof up to at least 2 to 1, then allowing the pulp to settle to cause sedimentation of the activated clay particles, and separating the supernatant liquid containing in solution soluble salts formed by said acid reaction.

3. The method of activating clay which comprises mixing clay with from 7% to 35% of its weight of concentrated sulphuric acid, then introducing the clay and acid mixture into sufficient water to form a fluid pulp, violently agitating the pulp and heating the same to a temperature of at least 180° F. for a sufficient length of time to cause reaction of said acid on constituents of the clay to form soluble salts, adjusting the water content of the pulp to provide a liquid-solid ratio of at least 2 to 1, then allowing the pulp to settle to cause sedimentation of the activated clay particles, and separating the supernatant liquid containing in solution soluble salts formed by the acid reaction.

4. The method of activating clay which comprises introducing clay, in divided condition, into a solution of acid containing from 7% to 35% of acid by weight of the clay and sufficient water to form a fluid pulp, violently agitating the pulp and heating the same to a temperature of at least 180° F. for a sufficient length of time to cause reaction of said acid on constituents of the clay to form soluble salts, adjusting the water content of the pulp to provide a liquid-solid ratio of at least 2 to 1, then allowing the pulp to settle to cause sedimentation of the activated clay particles, and separating the supernatant liquid containing in solution soluble salts formed by the acid reaction.

5. The method of activating clay which comprises mixing a clay with acid and with sufficient water to form a fluid pulp, heating and agitating said pulp for a sufficient time to cause reaction of said acid on constituents of the clay to form soluble salts, and then removing said soluble salts by a plurality of successive water washing and settling operations, each such operation including addition of water in sufficient quantity to provide a liquid-solid ratio of at least 2 to 1 followed by settling to cause sedimentation of the activated clay particles and separation of the supernatant liquid containing soluble salts in solution.

6. The method of activating clay which comprises mixing a clay with from 7% to 35% of its weight of concentrated acid and sufficient water to form a fluid pulp, heating and violently agitating said pulp for a sufficient time to cause reaction of said acid on constituents of the clay to form soluble salts, adjusting the water content of said pulp to provide a liquid-solid ratio of at least 2 to 1, allowing the pulp to settle to cause sedimentation of the activated clay particles, separating the supernatant liquid containing in solution soluble salts formed by the acid reaction, and then subjecting the settled activated clay particles to a plurality of successive washing and settling operations, each such operation including addition of water in sufficient quantity to provide a liquid-solid ratio of at least 2 to 1 followed by settling to cause sedimentation of the activated clay particles and separation of the supernatant liquid containing soluble salts in solution.

7. The method of activating clay which comprises mixing a clay with acid and with sufficient water to form a fluid pulp, heating and agitating said pulp for a sufficient time to cause reaction of said acid on constituents of the clay to form soluble salts, allowing the mass to settle to cause sedimentation of the activated clay particles, separating the supernatant liquid containing in solution soluble salts formed by the acid reaction, and then removing a further quantity of soluble salts from the activated clay by a plurality of successive water washing and settling operations, each such operation including the steps of adding sufficient water to form a pulp of sufficient fluidity for agitation, agitating said pulp, adjusting the water content of the pulp to provide a liquid-solid ratio of at least 2 to 1, settling to cause sedimentation of the activated clay particles, and separating the supernatant liquid containing soluble salts in solution.

8. The method of washing activated clay obtained by acid treatment which comprises adding water to the activated clay in such amount as to form a pulp of sufficient fluidity for agitation, agitating the pulp so formed, adjusting the water content of the pulp to provide a liquid-solid ratio of at least 2 to 1, allowing the pulp to settle to cause sedimentation of the activated clay particles, separating the supernatant liquid containing in solution soluble salts formed by the acid treatment, and repeating said operations until the desired degree of removal of soluble salts is obtained.

9. The method of washing activated clay obtained by acid treatment of a clay of the montmorillonite or bentonite type which comprises subjecting the clay to a plurality of water washing operations each of which comprises the steps of adding water to the clay, agitating the mixture, allowing the same to settle to cause sedimentation of the activated clay particles, and separating the supernatant liquid containing in solution soluble salts formed by the acid treatment, the water content of the mixture being adjusted to provide a liquid-solid ratio of at least 2 to 1 prior to each settling operation.

FREDERICK W. HUBER.